US008145993B2

(12) United States Patent
Agarwal et al.

(10) Patent No.: US 8,145,993 B2
(45) Date of Patent: Mar. 27, 2012

(54) XML-BASED TRANSLATION

(75) Inventors: Nipun Agarwal, Santa Clara, CA (US); Sanket Malde, San Carlos, CA (US); Bhushan Khaladkar, Mountain View, CA (US); Eric Sedlar, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1106 days.

(21) Appl. No.: 11/649,004

(22) Filed: Jan. 3, 2007

(65) Prior Publication Data

US 2008/0172603 A1    Jul. 17, 2008

(51) Int. Cl.
*G06F 17/00* (2006.01)
(52) U.S. Cl. ......... 715/239; 715/264; 715/265; 707/760
(58) Field of Classification Search .................. 715/264, 715/265, 239, 255, 234, 259; 704/1, 4, 5, 704/10, 2; 707/760
See application file for complete search history.

(56) References Cited

U.S. PATENT DOCUMENTS

| | | | | |
|---|---|---|---|---|
| 6,644,322 | B2 * | 11/2003 | Webb ............................. | 128/899 |
| 7,627,865 | B2 * | 12/2009 | Muhlestein et al. ........... | 717/165 |
| 7,630,974 | B2 * | 12/2009 | Remahl et al. ................. | 1/1 |
| 2002/0078068 | A1 * | 6/2002 | Krishnaprasad et al. .. | 707/104.1 |
| 2004/0267803 | A1 * | 12/2004 | Zhou et al. .................... | 707/102 |
| 2006/0074894 | A1 * | 4/2006 | Remahl et al. ................ | 707/4 |
| 2006/0195831 | A1 * | 8/2006 | Bossom et al. ................ | 717/162 |
| 2007/0156748 | A1 * | 7/2007 | Emam et al. .................. | 707/102 |
| 2007/0219959 | A1 * | 9/2007 | Kanemasa ...................... | 707/3 |

OTHER PUBLICATIONS

EPO, Int'l. Search Report dated Jul. 25, 2008, for Int'l. Appl. No. PCT/US2008/000028, filed Jan. 3, 2008.
Boer et al., "MetaLex: Legislation in XML", 2002, pp. 1-10, IOS Press, Legal Knowledge & Information Systems. Jurix 2002 15th annual conf., Amsterdam.
Stewart C. Russell:, "Creating Bilingual Phrasebooks from a Multilingual XML Database" [online], Jul. 7, 2006, pp. 1-5, XP002488227, from internet (see link below).
URL: http://web.archive.org/web/20060707081512/http://scruss.com/multilingual-xslt.html.
Cruz-Lara et al., "Multilingual Information Framework for . . . ", May 2005, p2-3,Proceedings of IEEE AMT 2005, 3rd intl. conf. on active media technology, Takamatsu, Kagawa, JP.
Anonymous, "A White Paper on ver. 1.1 of the XML Localisation . . . (XLIFF)", Jul. 22, 2003, Oasis, XP-002482966, whole document, [retrieved on Jul. 22, 2003].

(Continued)

*Primary Examiner* — Thu Huynh
(74) *Attorney, Agent, or Firm* — Kraguljac Law Group, LLC

(57) ABSTRACT

Systems, methods, and other embodiments associated with providing an XML-based translation service are described. One method embodiment includes accessing a translation-aware XML document that may comply with a translation-enabling XML schema. The document may store a first XML element that stores translatable data and a second XML element that stores a translation of the translatable data. The schema may describe that the first XML element includes a first identifier that identifies the first element as storing translatable data. The schema may also describe that the second XML element includes a second identifier that identifies the second element as storing a translation for translatable data. The method may also include establishing a session language identifier and providing a virtual view of the translation-aware XML document, the virtual view being determined, at least in part, by the session language identifier.

20 Claims, 7 Drawing Sheets

OTHER PUBLICATIONS

"Open Language Tools XLIFF Translation Editor" [Online], Feb. 19, 2008, XP002469657, from internet: URL:https://open-language-tools.dev.java.net/editor/about-xliff-editor.html.

EPO, Written Opinion of International Searching Authority, dated Jul. 25, 2008, for Int'l. Appl. No. PCT/US2008/000028, filed Jan. 3, 2008.

EP Office Action dated Nov. 25, 2009 in co-pending EP Application No. 08 712 938.3 (filing date Jun. 29, 2009).

Alexander Boer et al., "METALex: Legislation in XML", 2002, IOS Press, Legal Knowledge and Information Systems, Jurix 2002 15th Annual Conf., pp. 1-10, XP002479807.

* cited by examiner

XML-BASED TRANSLATION

CROSS REFERENCE TO RELATED APPLICATIONS

This application is related to the following U.S. patent application, which is assigned to the present assignee: "QUERY MODES FOR TRANSLATION-ENABLED XML DOCUMENTS", Ser. No. 11/648,950 filed contemporaneously with this application on Jan. 3, 2007, inventors: Nipun Agarwal, Sanket Malde, Bhushan Khaladkar, Ravi Murthy, and Sivasankaran Chandrasekar.

BACKGROUND

Internationalization of computer applications may involve planning and implementing products and/or services to be adapted to specific local languages, cultures, and so on. Internationalized applications may therefore seek to have content (e.g., strings) stored in multiple languages. Conventionally, a relational database table(s) would store this content (e.g., prompts, error messages, headings, button labels, menu items). In this conventional approach, an application and/or database would require a priori knowledge of the set of languages to be supported for the internationalization. With this knowledge, database table(s) would then be constructed and populated with translations for all the supported languages. If no translation was available for a particular language, a meaningless translation and/or a default translation may have been stored. This approach was wasteful and was not transparent to users and/or applications. Furthermore, updating these conventional tables and/or applications was difficult, time-consuming, and/or prone to error.

BRIEF DESCRIPTION OF THE DRAWINGS

The accompanying drawings, which are incorporated in and constitute a part of the specification, illustrate various example systems, methods, and other embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an internal component of another element may be implemented as an external component and vice versa, and so on. Furthermore, elements may not be drawn to scale.

DETAILED DESCRIPTION

Figure 1:
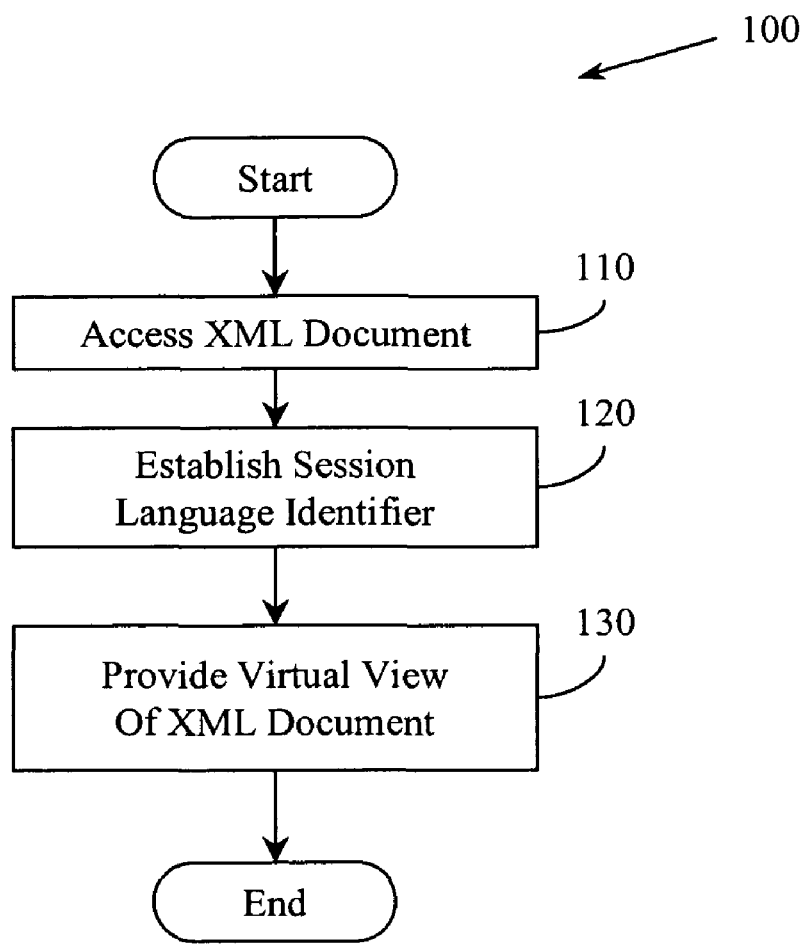
FIG. 1 illustrates an example method associated with providing XML-based translation.

Example systems and methods provide an XML-based translation service. Thus, example systems and methods describe storing translations for content (e.g., strings) in schema-based XML documents that are stored in an XML-enabled database. An XML-enabled database can store and process XML documents using XML compliant interfaces and logics (e.g., XPath, XQuery). Example systems and methods also describe providing a virtual view of stored XML documents, where the view may be determined by a session language associated with an application making use of the stored translations and translatable elements. The application may be a dynamically customizable internationalized application that provides a localized experience to a user based on a language associated with the locale and/or the user. A set of translations for a translatable element may be produced from an original translatable element that is provided in a source language. The source language for the set of translations may be indicated in an XML document that stores the set of translations. Thus, example systems and methods may provide a translated version of a string for which a translation(s) is available and may provide a default (e.g., "source language") version of a string for which no translation is available. Providing the default "source language" version facilitates saving memory over conventional systems where duplicate "error" translations may be stored in table rows for a supported yet currently unpopulated language (e.g., a language for which no translation is available). In an XML document associated with example systems and methods, no entry would appear for an unsupported language.

Elements that can be translated (e.g., elements for which there may be a translation), may be annotated with an identifier that indicates that the element may be translated. The identifier may be, for example, an XML attribute and/or a value for an XML element. Elements that are translations for an element that can be translated may also be annotated with an identifier that indicates that the element is the representation of an element in a certain language. These elements may also include an identifier that indicates the language of the stored element. The identifier may be, for example, an XML attribute that denotes the translation language (e.g., xml:lang=English).

These annotations may be used (e.g., analyzed, processed) by XML interfaces, XML functions, extensions to XML interfaces, extensions to XML functions, and so on, to provide translation services and thus to provide a virtual XML document with which an internationalized application may interact. The internationalized application may be dynamically customizable with, for example, translations of strings (e.g., button labels, error messages, menu items). The interactions may produce, for example, queries for stored information, updates to stored information, and so on. These interactions may involve analyzing the annotations and working with updated XML logics including an XPath logic, an XQuery logic, and so on. These interactions may take place using, for example, an xmltype interface.

Storing elements that can be translated in XML documents and storing translations for those elements in XML documents facilitates leveraging XML and XMLSchema standards. Additionally, since relational database tables are not used to store string translations, storage space is not wasted like it is in conventional approaches. For example, duplicate translations of default strings for "supported" languages for which no translation is available are not stored. Furthermore, since XML documents can be updated individually a priori knowledge of supported languages is not required. Similarly, adding and/or removing a language does not require relational database table rebuilds. All these factors contribute to providing a more transparent experience to users of internationalized applications. Additionally, these factors contribute to removing and/or mitigating restrictions on languages available for an internationalized language and facilitate decoupling internationalized applications from being dependent on a priori knowledge concerning supported languages.

Consider an application that might be used in different language environments. When a user begins interacting with the application, the user may identify a preferred language for the application. The application may then interact with an XML-based database configured to support translation-aware XML documents. These translation-aware XML documents may conform to a published XML schema that describes how to identify (e.g., annotate) elements so that they may interact with translation-capable XML logics (e.g., XPath, XQuery). The XML-based database may provide text (e.g., menu entries, button labels, error messages) to the application. The text may be selected to conform to the preferred language. For strings for which no translation is available in the preferred language, a "source language" version may be returned. The user may then supply their own translation, which may be used to update an XML document from which the source language version was retrieved. This translation-aware query and update functionality may be provided by manipulating (e.g., augmenting, extending, adapting) an XML interface (e.g., xmltype) to provide translation-enabling data (e.g., element annotations, attribute annotations, values) to logics in the XML-based database. Extending an XML interface may include, for example, adding a function to the interface that detects and processes translation specific XML items including elements, attributes, annotations, and so on.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer component", as used herein, refers to a computer-related entity (e.g., hardware, firmware, software, software in execution, combinations thereof). Computer components may include, for example, a process running on a processor, a processor, an object, an executable, a thread of execution, a program, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Machine-readable medium", as used herein, refers to a medium that participates in directly or indirectly providing signals, instructions and/or data that can be read by a machine (e.g., computer). A machine-readable medium may take forms, including, but not limited to, non-volatile media (e.g., optical disk, magnetic disk), and volatile media (e.g., semiconductor memory, dynamic memory). Common forms of machine-readable mediums include floppy disks, hard disks, magnetic tapes, RAM (Random Access Memory), ROM (Read Only Memory), CD-ROM (Compact Disk ROM), DVD, and so on.

In some examples, "database" is used to refer to a collection of data. In other examples, "database" may be used to refer to a set of collections of data. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, a disk, and so on. In different examples a data store may reside in one logical and/or physical entity and/or may be distributed between multiple logical and/or physical entities.

"Logic", as used herein, includes but is not limited to hardware, firmware, software and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. In some examples, logic may be fully embodied as software. Where multiple logical logics are described, it may be possible in some examples to incorporate the multiple logical logics into one physical logic. Similarly, where a single logical logic is described, it may be possible in some examples to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a natural language, a database query language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners.

"User", as used herein, includes but is not limited to, one or more persons, software, computers or other devices, or combinations of these.

"XML" refers to eXtensible Markup Language. XML facilitates describing data. An XML document may include elements, attributes, and tags. Tags may be user-defined. XML elements are extensible, have relationships (e.g., parent, child, sibling), have content, and can have attributes. XML attributes provide additional information about elements. In an XML document, data can be stored in attributes and/or in child elements.

"XMLSchema" refers to an XML logic that facilitates using an XML schema. An XML schema expresses a shared vocabulary that facilitates defining the structure, content, and semantics of XML documents. An XML schema defines and describes a class of XML documents by using schema components. The schema components may identify, constrain, and/or document the meaning, usage, and/or relationships of document parts (e.g., data types, elements, element content, attributes, attribute values). An XML schema also facilitates normalizing and defaulting element values and/or attribute values. An XML schema facilitates evaluating the validity of well-formed element and attribute information. An XML schema can be viewed as a set of XML components. XML components may include, for example, simple type definitions, complex type definitions, attribute declarations, element declarations, attribute group definitions, identity-constraint definitions, model group definitions, notation declarations, annotations, model groups, particles, wild cards, attribute uses, and so on. These components may be defined, for example, in terms of their properties. Properties may in turn be defined in terms of their range of values. From one perspective, an XML schema can be viewed as a labeled directed graph, where the root is a schema, where vertices are schema components or literals (e.g., string, Boolean, number), and where edges are properties. An XML schema describes legal building blocks for an XML document. The XML schema may define elements that can appear in a document and attributes that can appear in a document. The XML schema may also describe relationships between elements. For example, the XML schema may describe which elements are parents of other elements, which elements are children of other elements, which elements are sibling of other elements, the order of elements, and so on. An XML schema may also describe whether an element is empty, whether it can include text, whether it has a default value, and so on. An XML schema may also describe data types for elements and attributes and default and/or fixed values for elements and attributes.

"XPath", as used herein, refers to a logic, language, and/or expression for finding information in an XML document. XPath defines a syntax for defining parts of an XML document and thus facilitates navigating through elements and attributes in an XML document. XPath uses expressions to perform this navigation. An XPath expression returns either a node set, a string, a Boolean, or a number. XPath contains a library of standard functions and uses path expressions to select nodes or node-sets from an XML document. In example systems and methods, an XPath expression may interact, for example, with a translate( ) function that facilitates returning a string in a translated form that agrees with a session language associated with a user and/or application. In example systems and methods, XPath may be modified to locate a translated string associated with a session language. The locating may be performed by interacting with an XML document(s) and thus without doing a table scan. The locating may involve XPath expressions that are rewritten by example systems and methods to interact with annotations of translation-aware XML elements. Storing annotated strings in an XML document rather than storing string/key pairs in a relational database table(s) facilitates indexing translated strings. Indexing the translated strings facilitates, for example, quicker translated string retrieval and/or default string retrieval since a string match does not need to be performed against all strings in a table. Instead, an indexed search may be performed, in some examples without having to build an in-memory tree.

"XQuery", as used herein, refers to a logic, language, and/ or expression. XQuery is to XML what SQL (structured query language) is to database tables in that XQuery is used to query XML data. XQuery provides a language for finding and/or extracting elements and/or attributes from XML documents. Example systems and methods may adapt XQuery to make it translation-aware. Thus, XQuery may interact with a translate( ) function.

"XML DOM", as used herein, refers to the XML document object model (DOM). The XML DOM defines a standard way to access and/or manipulate XML documents. The XML DOM presents an XML document as a tree structure of elements having other embedded elements, where elements are referred to as nodes. The XML DOM facilitates programs dynamically accessing and/or updating the content, structure, and/or style of an XML document.

Example systems and methods may rely on and/or provide an XML schema that supports translations. The schema may describe how a string that can be translated can be identified (e.g., marked, annotated) to denote that it may be translated. Elements so identified may be processed differently by updated XML logics including an XPath logic, an XQuery logic, and so on. Additionally, elements so identified may be processed by an XPath extension function (e.g., translate( )).

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent computer-executable instructions. While the figures illustrate various actions occurring in serial, it is to be appreciated that in some examples various actions could occur concurrently, substantially in parallel, and/or at substantially different points in time.

FIG. 1 illustrates a method 100 associated with providing an XML-based translation. Method 100 may include, at 110, accessing a translation-capable XML document. Being translation-capable means that the XML document may store data (e.g., text, strings) that may be translated and translations of that data. Additionally, being translation-capable means that the data is stored in elements that are described as having identifiers (e.g., annotations) to identify the data and to facilitate translation processing. The elements may be described, for example, in an XML schema.

Thus, the translation-capable XML document may store a first XML element that stores a translatable string and may also store a second XML element that stores a translation of the translatable string. The first XML element may be annotated to identify the first element as storing a translatable string. Similarly, the second XML element may be annotated to identify the second element as storing a translation for a translatable string. In one example, the annotations may take the form of XML element attributes. These annotations may be processed by, for example, XML logics including XPath, XQuery, and so on. Formats, relationships, default values, and so on for the first XML element and the second XML element may be described in an XML schema.

Method 100 may also include, at 120, establishing a session language identifier. This identifier may indicate the language in which a user may wish to interact with an application. The application may be, for example, a dynamically configurable internationalized application. The identifier may be generated, for example, by a user, by the application, and so on. The identifier may be, for example, a value passed from an application to an XML interface, a value passed from an application to an XML database, and so on. A value representing the identifier may be stored, for example, in the XML database.

Method 100 may also include, at 130, providing a virtual view of the translation-capable XML document. The virtual view may be achieved by providing data (e.g., text, strings) of a single language to a user and/or application. The language for the virtual view may be determined, at least in part, by the session language identifier. The virtual view may make an XML document that includes strings in many languages appear to a user and/or application as a single-language document.

The virtual view facilitates making transparent the translation services provided by method 100. For example, a user may never know that the application they are using is interacting with an XML document that stores translations. In one example, the virtual view provides a localized view of the translation-capable XML document to an internationalized application that can be dynamically configured. The dynamic configuration may include, for example, updating menu items, error messages, prompts, and so on, to appear in a language identified by the session language identifier.

In one example, method 100 may also include providing an XML schema that describes an XML document for which a virtual view may be provided. The XML schema may identify the various elements for storing the data, may identify the annotations and their possible values, may identify relationships (e.g., parent, child, sibling) between elements, and so on. The XML schema may also identify default values for text for which no translation is available for certain languages. This facilitates saving memory that would be wasted in conventional systems that store duplicate "no translation available" strings.

In one example, a method may be implemented as processor executable instructions. Thus, in one example, a machine-readable medium may store processor executable instructions that if executed by a machine (e.g., processor) cause the machine to perform a method that includes accessing a translation-capable XML document, establishing a session language identifier, and providing a virtual view of the translation-capable XML document. The virtual view may be determined, at least in part, by the session language identifier. While the above method is described being stored on a machine-readable medium, it is to be appreciated that other example methods described herein may also be stored on a machine-readable medium.

Figure 2:
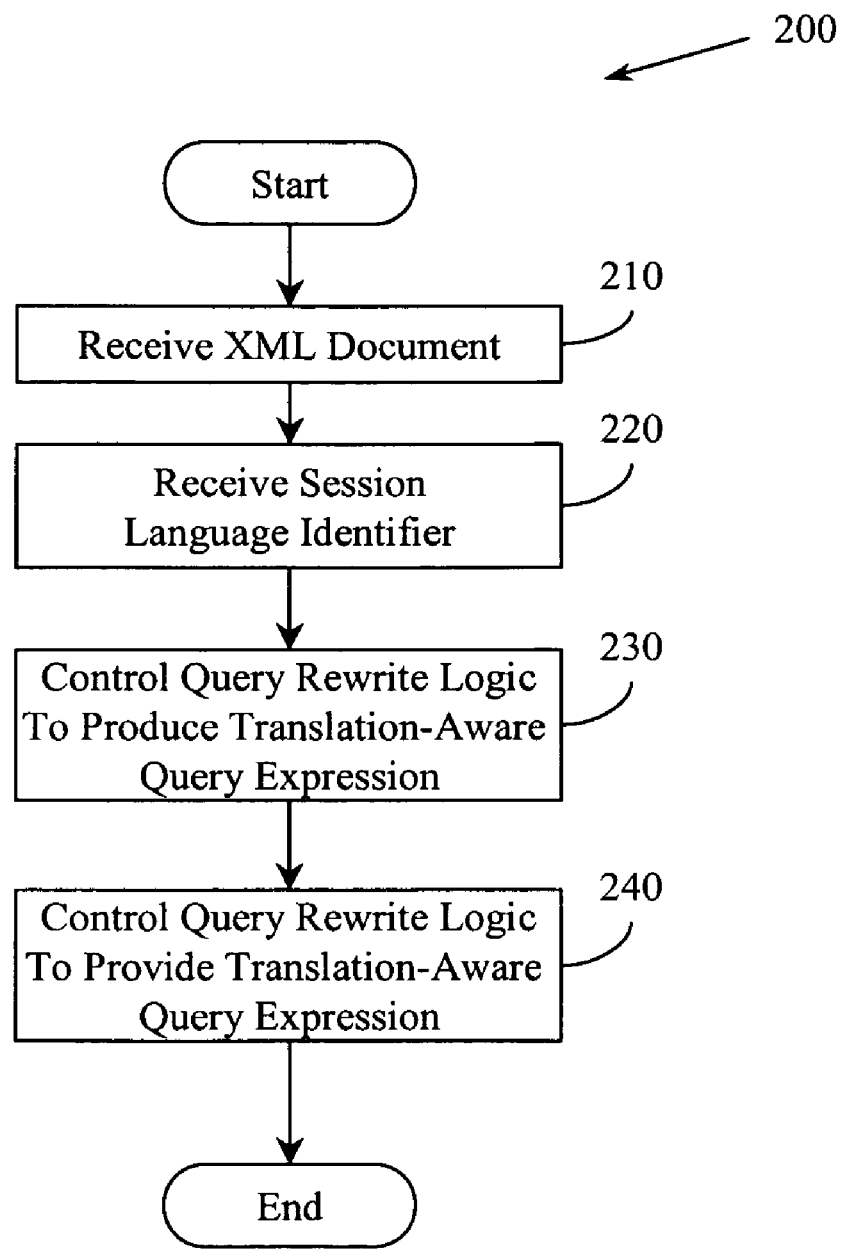
FIG. 2 illustrates an example method associated with providing XML-based translation.

FIG. 2 illustrates a method 200 associated with providing an XML-based translation. Method 200 may include, at 210, receiving a translation-capable XML document from a user. The translation-capable XML document may be substantially similar to the translation-capable XML document described in connection with FIG. 1.

Method 200 may also include, at 220, receiving a session language identifier from an internationalized application that can be dynamically configured. The session language identifier may be substantially similar to the session language identifier described in connection with FIG. 1.

Method 200 may also include providing a virtual view like that described in connection with FIG. 1. The virtual view may be provided, at least in part, by controlling a database query rewrite logic to produce at 230 a translation-capable query expression. Producing a translation-capable query expression may include, for example, receiving a standard query that is not translation-capable and rewriting it to be translation-capable. The rewriting may include, for example, adding a predicate(s) that understands and takes advantage of identifiers (e.g., annotations) for elements described in an XML schema with which the XML document received at 210 complies.

The virtual view may also be provided, at least in part, by controlling the database query rewrite logic to provide, at 240, the translation-capable query expression to an XML database logic. The XML database logic may be, for example, an XPath logic, and/or an XQuery logic.

A standard XML query (e.g., not translation-aware) to a standard XML database (e.g., not translation-aware) may include a predicate(s). However, a standard XML query and a standard XML database may not be translation-capable and thus may not recognize and/or respond to translation-sensitive data (e.g., attributes, annotations). Thus, the standard predicates may not consider the information provided by the translation-enabling XML schema. However, the translation-capable query expression produced at 230 may include a predicate that processes an annotation associated with a translatable string, and/or a translation of the translatable string.

In one example, providing the virtual view may include providing a translation-capable database service for an internationalized application that can be dynamically configured. The internationalized application may use the virtual view to interact with an XML document stored in an XML database. The translation-capable database service may include a query function. Thus, when a query for certain data (e.g., menu items) is received from the application, the query may be rewritten to take advantage of the translation services provided by method 200. Therefore, localized translations of the strings representing the menu items may be provided to the application by searching an XML document where the searching is controlled, at least in part, by the annotations associated with the translation services. This may occur transparently to the user, meaning that the user may not have requested this service or may not have been aware that it was occurring. The translation-capable database service may also include an update function. Thus, when a user changes a customizable string (e.g., corrects the spelling in a menu item, re-arranges words in an error message, changes words in a prompt), this updated string may be used to update the XML document from which the original translation was taken. For example, the updated string may replace the original translation and/or may be installed as an "alternate" translation. Once again, this may be transparent to the user.

Figure 3:
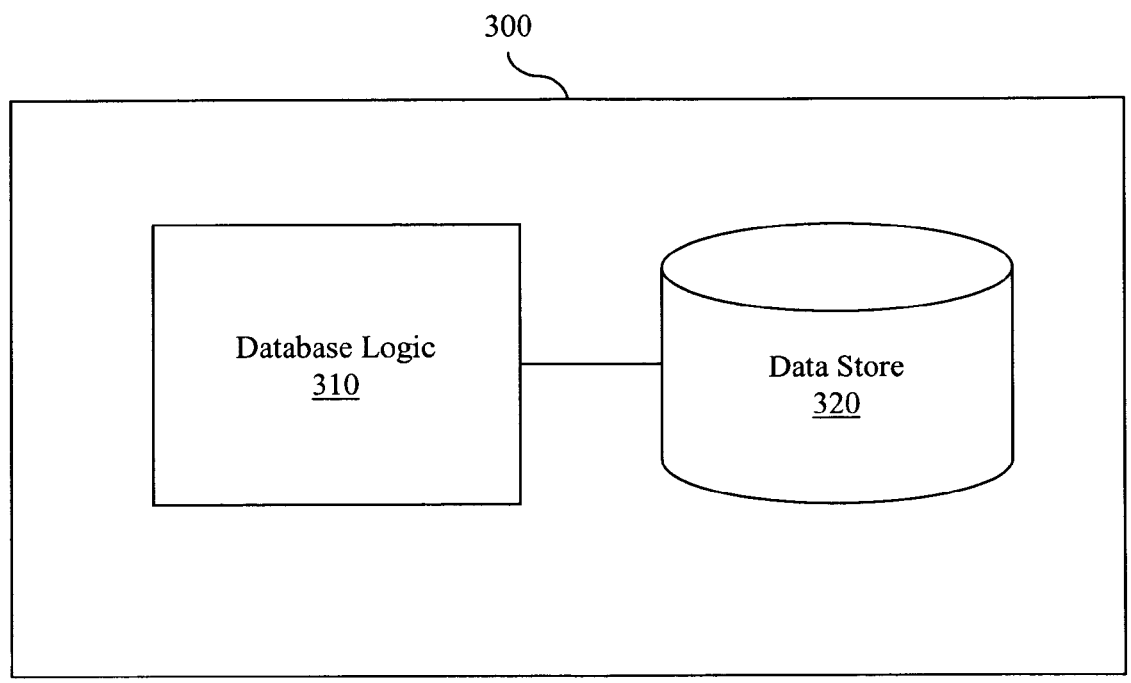
FIG. 3 illustrates an example system associated with providing XML-based translation.

FIG. 3 illustrates a system 300 associated with providing an XML-based translation. System 300 may include an XML-enabled database logic 310 and a data store 320. Logic 310 may provide a translation service to a dynamically customizable application that processes a text string. The text string may be used, for example, as a prompt, an error message, a button label, a menu item label, content, and so on. In one example, logic 310 may be a single logic that is integrated into an XML database. In another example, logic 310 may be distributed across two or more logics that are integrated into an XML database. In yet other examples, logic 310 may be a single logic that interacts with an XML database or may be a set of logics that interact with an XML database. While four scenarios are described, it is to be understood that other combinations may be employed.

Data store 320 may store an XML document that conforms to a translation-enabling XML schema. The translation-enabling schema may describe and thus the XML document may include a first element that stores a first string in a first language. The translation-enabling schema may also describe and thus the XML document may also include a second element(s) that stores a second string in a second language(s), the second string being a translation for the first string. The document may be provided, for example, from a user. The document may be used to provide translation strings for an internationalized application that can be dynamically configured.

Figure 4:
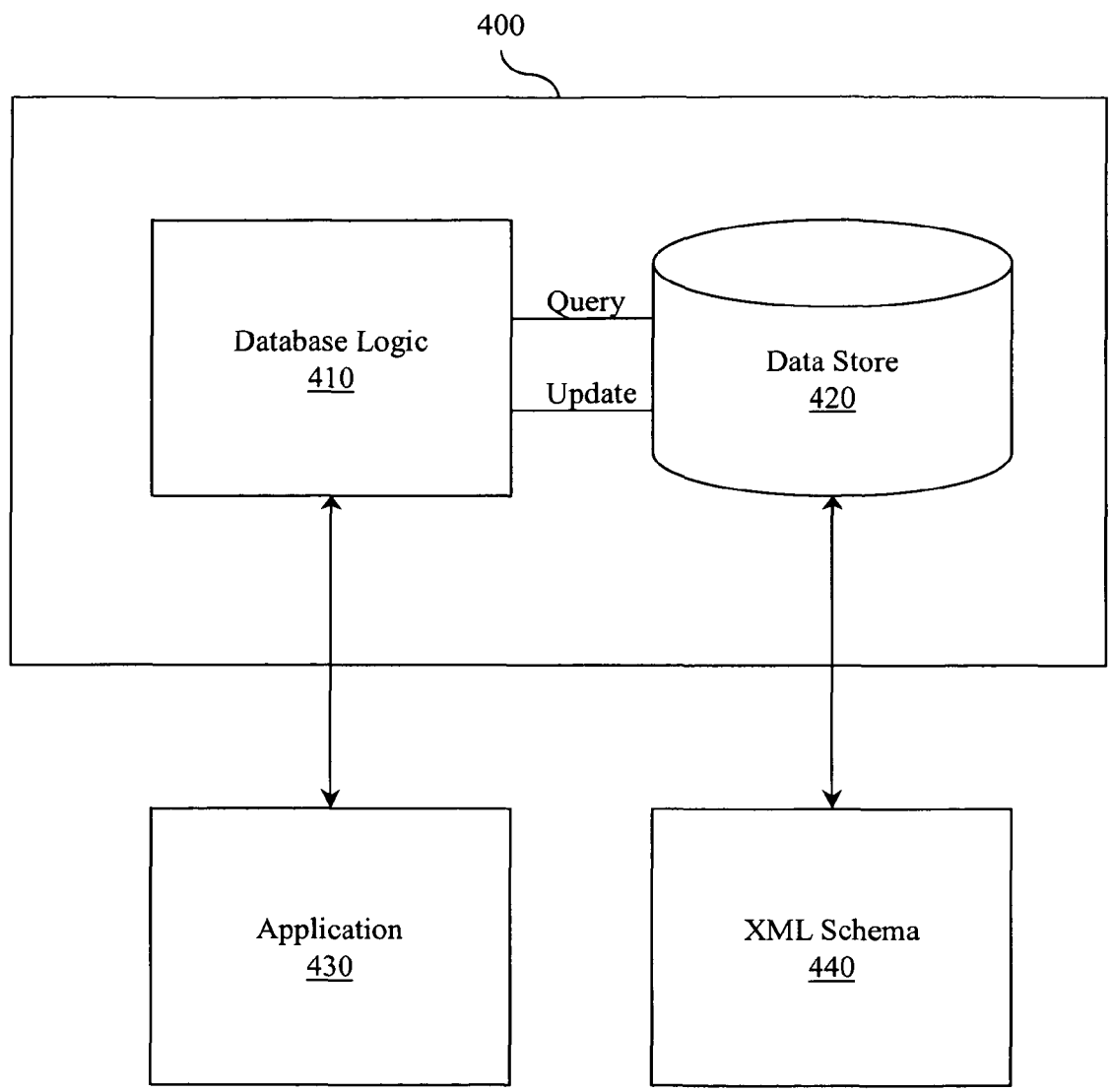
FIG. 4 illustrates an example system associated with providing XML-based translation.

FIG. 4 illustrates a system 400 associated with providing an XML-based translation. System 400 includes some elements similar to those associated with FIG. 3. For example, system 400 includes a database logic 410 and a data store 420 similar to logic 310 and data store 320. In one example, the XML-enabled database logic 410 may provide a translation-enabled query service to a dynamically customizable application 430. The translation-enabled query service may be used to query an XML document that conforms to a translation-enabling XML schema 440. The translation-enabled query service facilitates receiving a query for a string and then searching for an appropriate translation of the string. The XML-enabled database logic 410 may also provide a translation-enabled update service to update an XML document that conforms to the translation-enabling XML schema 440. The translation-enabled update service facilitates changing and/or adding a translation to the XML document. In one example, the service may also facilitate deleting a translation. Both the query and the update may be transparent to the user with respect to the translations occurring. Changing a translation may include, for example, locating a string to change by searching an XML document. The searching may depend, at least in part, on identifiers (e.g., annotations) described in the XML schema 440 and present in the XML document. Similarly, adding a translation may include determining that no string or entry for a language is present in an XML document, where the determining may depend, at least in part, on elements, attributes, annotations, and so on, described in the XML schema 440 and present in the XML document.

Figure 5:
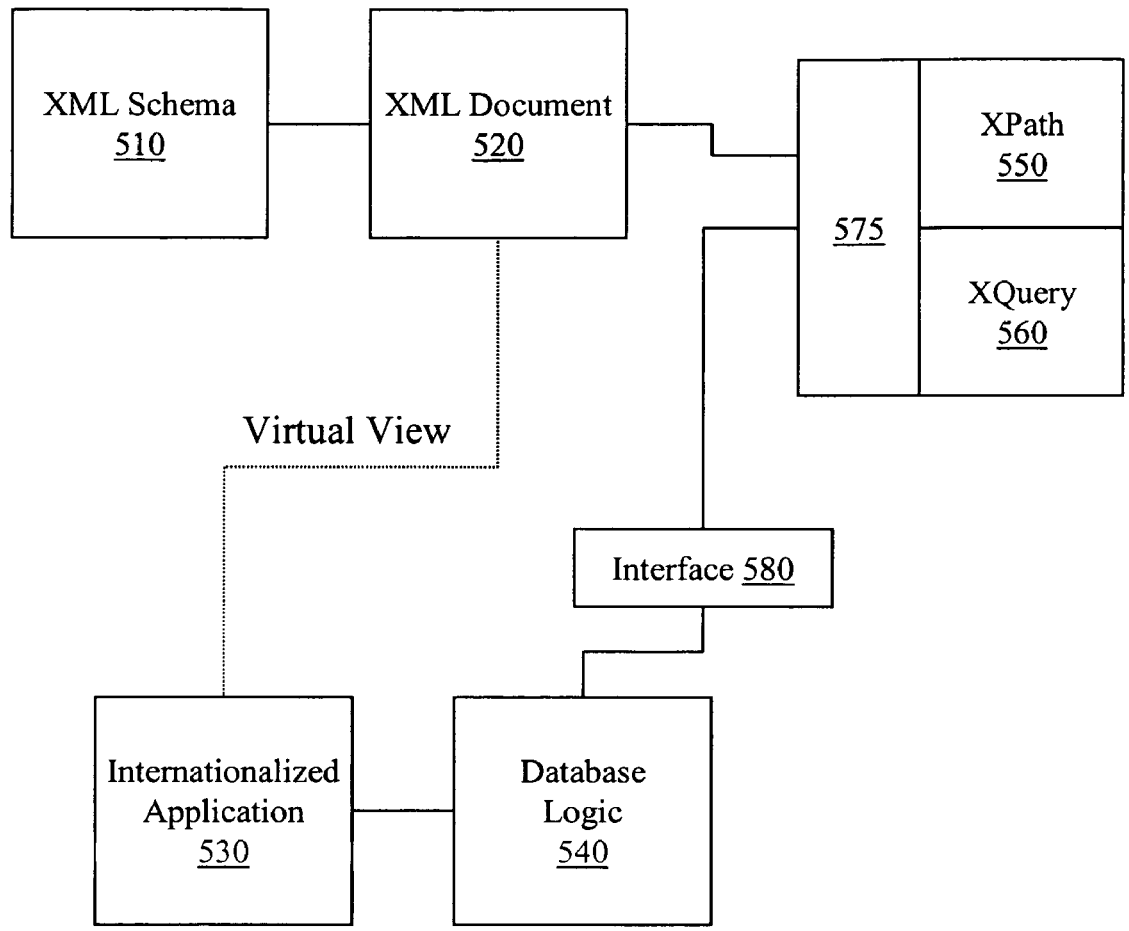
FIG. 5 illustrates an example database logic associated with providing XML-based translation.

FIG. 5 illustrates a database logic 540 that provides an XML-based translation service for an internationalized application 530. Internationalized application 530 may be provided with a virtual view of an XML document 520 that conforms to an XML schema 510. In one example, the XML schema 510 describes a first element having a first identifier to identify the first element as storing data for which a translation(s) may be available. Additionally, the XML schema 510 may describe a second element having a second identifier to identify a second data as a translation for the first data. The XML schema 510 may also describe a third identifier that identifies a default translation for a first data. This default translation may be defined as being the "source language" for the data. These three identifiers may be implemented, for example, as XML attribute annotations to XML elements.

Database logic 540 may interact with an XML database through a modified interface 580. In one example, the interface 580 may be the xmltype interface. Interface 580 may interact with XML logics (e.g., XPath 550, XQuery 560), among others, through an extension 575 to one and/or all of these logics. In one example, the extension 575 may be a function (e.g., translate( )) that understands how to process translation-enabling annotations (e.g., first identifier, second identifier, third identifier) described in XML schema 510, instances of which may appear in XML document 520. Thus, in one example the XML-enabled database logic 540 provides the translation-enabled query service and the translation-enabled update service by interacting through the modified xmltype interface 580 with an XPath logic 550, and an XQuery logic 560.

Figure 6:
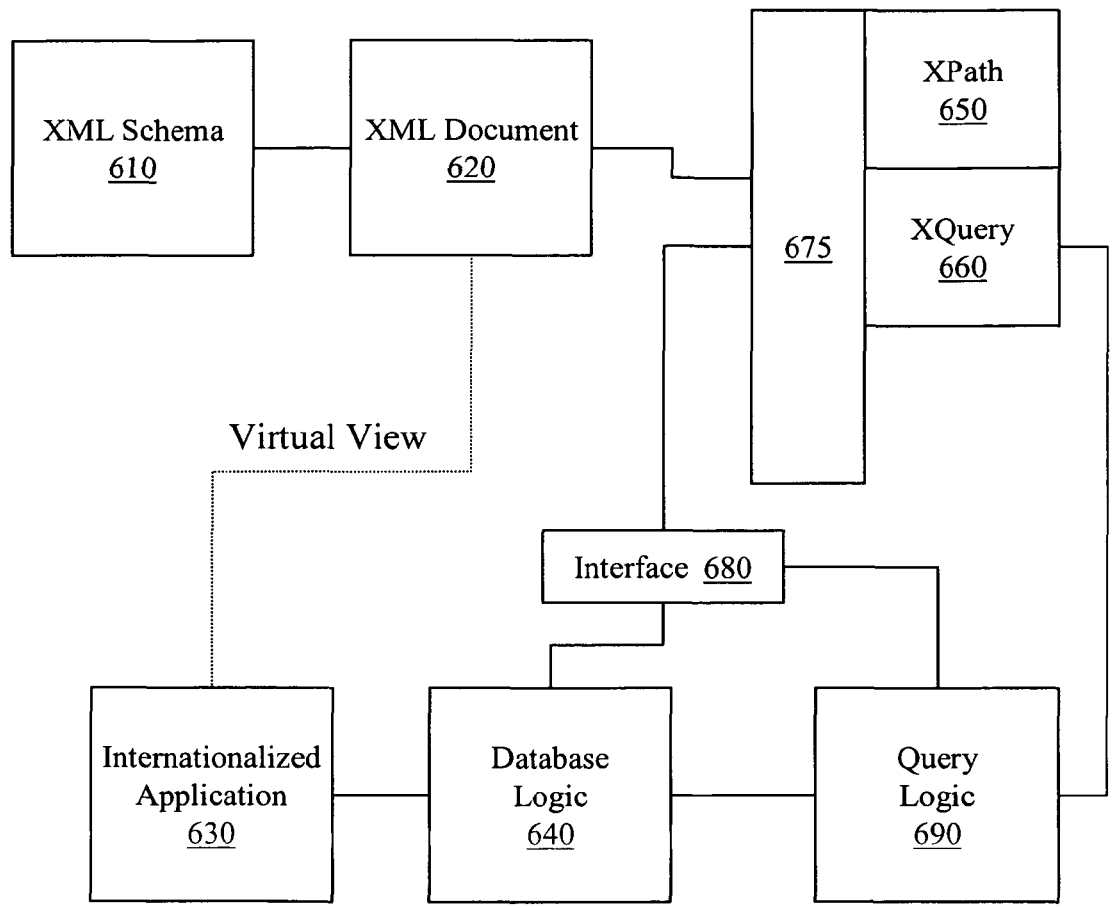
FIG. 6 illustrates an example database logic associated with providing XML-based translation.

FIG. 6 illustrates a database logic 640 that provides transparent XML-based translation. Logic 640 interacts with components similar to those with which logic 540 (FIG. 5) interacts. For example, logic 640 provides a virtual view of an XML document 620 described by an XML schema 610. The virtual view may be provided to an internationalized application 630. The view may facilitate providing translations of items like messages, error messages, prompts, content, and so on. Logic 640 may interact with XML logics (e.g., XPath 650, XQuery 660) through an extension 675 and a modified interface 680.

Additionally, database logic 640 may control, at least in part, a query logic 690. Query logic 690 may be used, for example, to locate information in an XML document stored in an XML database. Query logic 690 may also be used, for example, to extract and/or update information in an XML document in an XML database. Database logic 640 may control query logic 690 to process a non-translation-enabled query into a translation-enabled query. Controlling the query logic 690 may include, for example, controlling the query logic 690 to add a predicate to a non-translation-enabled query. This predicate may concern elements, attributes, and/or annotations described in XML schema 610 and present in XML document 620. By way of illustration, the predicate may concern a value for an instance of a first identifier associated with identifying a string as being a translatable string, a value for an instance of a second identifier associated with identifying a string as being a translation of a string, and a value for an instance of a third identifier associated with identifying a source language for a translatable string. While three identifiers are described, it is to be appreciated that in different examples a greater and/or lesser number of identifiers may be employed.

Additionally, database logic 640 may control query logic 690 to normalize a non-normalized query expression into a normalized query expression. A non-normalized query expression may include a compound entry and a normalized query expression may include no compound entries. Normalizing the query expression may include, for example, parsing an original query to locate a compound entry, decomposing the compound entry into a set of simple (e.g., atomic) entries, and rewriting the original query by replacing a compound entry with a set of simple entries.

Figure 7:
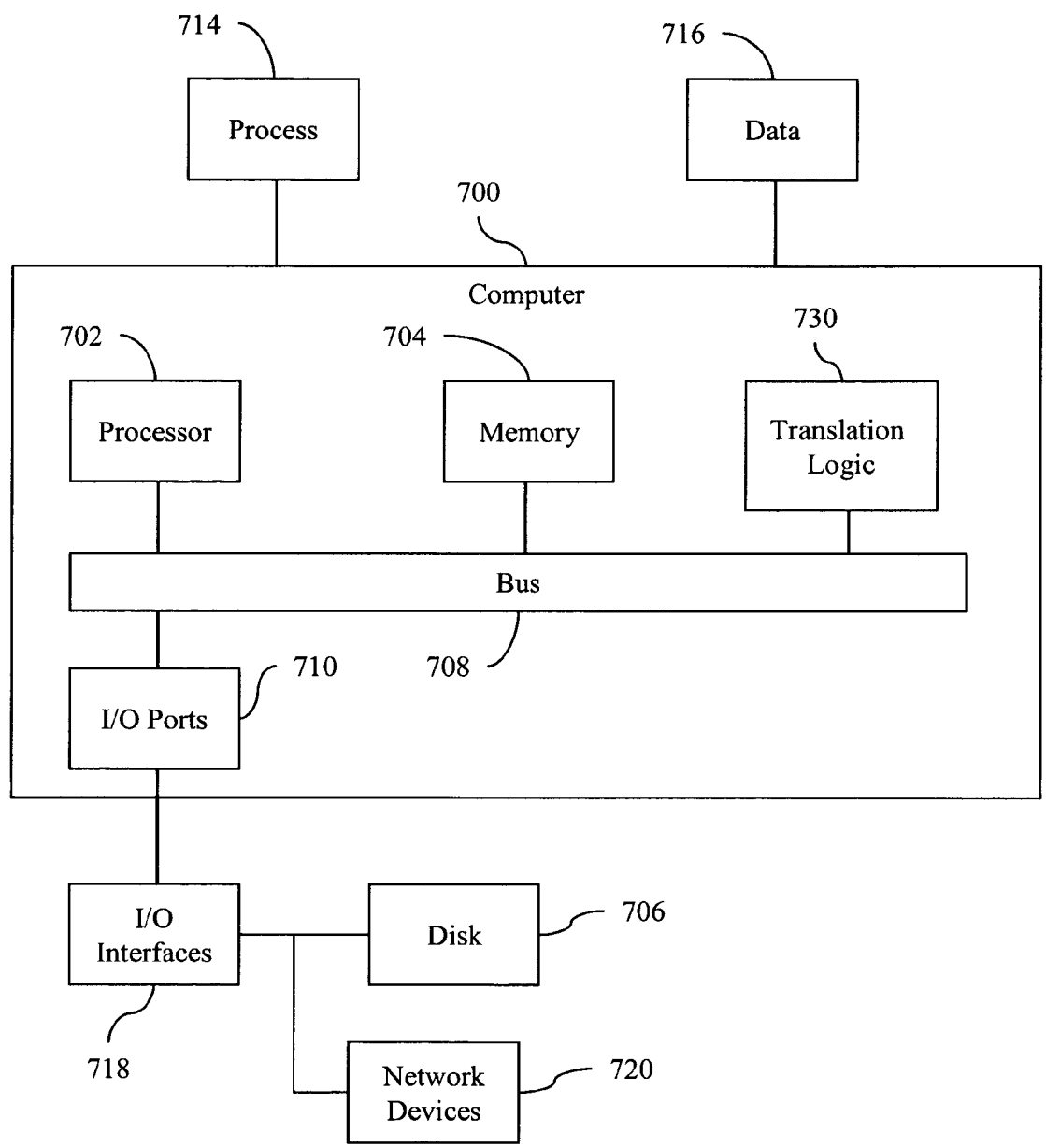
FIG. 7 illustrates an example computing environment in which example systems and methods illustrated herein may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a translation logic 730 configured to facilitate providing an XML-based translation service. In different examples, the logic 730 may be implemented in hardware, software, firmware, and/or combinations thereof. Thus, the logic 730 may provide means (e.g., hardware, software, firmware) for providing a description of an XML document having an element(s) for which a translation may be available. The description may include, for example, an XML schema. Logic 730 may also provide means for storing an XML document that conforms to the description. The means may include, for example, memory, disk, and so on. Logic 730 may also provide means (e.g., hardware, software, firmware) for determining a session language. The logic 730 may also provide means (e.g., hardware, software, firmware) for receiving a query from an internationalized application and means (e.g., hardware, software, firmware) for providing a session language view of an element in an XML document to the internationalized application. While the logic 730 is illustrated as a hardware component attached to the bus 708, it is to be appreciated that in one example, the logic 730 could be implemented in the processor 702.

Generally describing an example configuration of the computer 700, the processor 702 may be a variety of various processors including dual microprocessor and other multiprocessor architectures. A memory 704 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, and/or a memory stick. Furthermore, the disk 706 may be a CD-ROM, a CD recordable drive (CD-R drive), a CD rewriteable drive (CD-RW drive), and/or a digital video ROM drive (DVD ROM). The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, SATA, Infiniband, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a local area network (LAN), a wide area network (WAN), and other networks.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-implemented method, comprising:
  accessing a translation-capable XML document, where the translation-capable XML document stores translatable data;
  establishing a session language identifier; and
  providing a virtual view of the translation-capable XML document, where the virtual view is determined, at least in part, by the session language identifier, and where the virtual view presents one or more of, the translatable data, and a translation for the translatable data, and where the providing includes controlling database query rewrite logic to rewrite a non-translation-capable query expression to produce a translation-capable query expression and providing the translation-capable query expression to an XML database logic, where the non-translation-capable query expression is part of a query to retrieve information from the translation-capable XML document;

wherein producing the translation-capable query expression includes receiving a non-translation-capable query that includes the non-translation-capable query expression and rewriting the non-translation-capable query expression to be translation-capable by adding at least a predicate to the non-translation-capable query where the predicate includes attributes for translating portions of the translation-capable query expression or portions of the translation-capable XML document.

2. The method of claim 1, including providing an XML schema that describes an XML document for which the virtual view is provided.

3. The method of claim 1, where the virtual view provides a localized view of the translation-capable XML document to an internationalized application that can be dynamically configured, at least in part, using the translation for the translatable data.

4. The method of claim 1, including receiving the translation-capable XML document from a user.

5. The method of claim 1, where establishing the session language identifier includes receiving the session language identifier from an internationalized application that can be dynamically configured.

6. The method of claim 1, where the XML database logic being one or more of, XPath logic, and XQuery logic.

7. The method of claim 1, where the predicate is configured to process an XML element associated with one or more of, a translatable string, and a translation of the translatable string.

8. The method of claim 1, where providing the virtual view includes providing a translation-capable database service for an internationalized application that can be dynamically configured, the internationalized application using the virtual view to interact with an XML document stored in an XML database, the translation-capable database service including one or more of, a query function, and an update function.

9. A computer-implemented method, comprising:
providing an XML schema that describes an XML document, the XML document including a first element that stores a translatable string and a second element that stores a translation for the translatable string;
receiving a translation-capable XML document that conforms to the XML schema, where the translation-capable XML document stores a second translatable string and one or more translations of the second translatable string;
receiving a non-translation-capable query expression that is determined to not include attributes for translating contents of the non-translation-capable query expression;
receiving a session language identifier from a dynamically configurable internationalized application; and
generating a virtual view of the translation-capable XML document in a displayable form, where the virtual view is determined, at least in part, by the session language identifier, and where generating the virtual view includes controlling database query rewrite logic to rewrite the non-translation-capable query expression, where a query expression is part of a query to retrieve information, to produce a translation-capable query expression and to provide the translation-capable query expression to XML database logic, wherein the database query rewrite logic adds a predicate to the translation-capable query expression wherein the predicate processes an XML attribute associated with one or more of, a translatable string, and a translation of the translatable string.

10. A non-transitory machine-readable medium having stored thereon machine-executable instructions that if executed by a machine cause the machine to perform a method, the method comprising:
accessing a translation-capable XML document, where the translation-capable XML document stores a first XML element that stores a translatable data, and where the translation-capable XML document stores a second XML element that stores a translation of the translatable data, where the first XML element identifies the first element as storing the translatable data, and where the second XML element identifies the second element as storing the translation for the translatable data;
establishing a session language identifier; and
generating a virtual view of the translation-capable XML document, where the virtual view is determined, at least in part, by the session language identifier, where the generating includes controlling database query rewrite logic to rewrite a non-translation-capable query expression to produce a translation-capable query expression and providing the translation-capable query expression to XML database logic, where the non-translation-capable query expression is part of a query to retrieve information;
wherein rewriting the non-translation-capable query expression includes adding at least a predicate to the non-translation-capable query where the predicate includes attributes for translating portions of the translation-capable query expression or portions of the translation-capable XML document.

11. A system, comprising:
XML-enabled database logic, implemented with at least a non-transitory machine readable medium, to provide a translation service to a dynamically customizable application that processes a text string, and where the XML-enabled database logic controls query logic to rewrite a non-translation-enabled query, into a translation-enabled query that is able to be translated into a different language by adding at least a predicate to the non-translation-enabled query where the predicate includes attributes for translating portions of the translation-enabled query;
at least one processor for at least operating with the XML-enabled database logic; and
a data store, configured on at least one non-transitory machine readable medium, to store an XML document that conforms to a translation-enabling XML schema, the XML document including a first element that stores a first text string in a first language and one or more second elements that store one or more corresponding second text strings in one or more second languages, the second text strings being translations defined for the first text string, the first element including an annotation that identifies the first text string as storing a string for which a translation may be available, the one or more second elements including an annotation that identifies the second elements as storing corresponding translation strings.

12. The system of claim 11, where the XML-enabled database logic provides one or more of, a translation-enabled query service to query an XML document that conforms to the translation-enabling XML schema, and a translation-enabled update service to update the XML document that conforms to the translation-enabling XML schema.

13. The system of claim 12, where the XML-enabled database logic modifies the behavior of an interface to an XML database.

14. The system of claim 13, where the interface being the xmltype interface.

15. The system of claim 13, where the XML-enabled database logic provides the translation-enabled query service and the translation-enabled update service by interacting through the modified interface with one or more of, XQuery logic, and XPath logic.

16. The system of claim 11, where the translation-enabling schema describes a first element having a first identifier to identify the first text string as a string for which one or more translations may be available, where the translation-enabling schema describes a second element having a second identifier to identify the one or more second text strings as a translation for a first text string, and where the translation-enabling schema describes a third identifier to identify a default translation for a first text string.

17. The system of claim 16, where the predicate includes a value for an instance of the first identifier, a value for an instance of the second identifier, or a value for an instance of the third identifier.

18. The system of claim 16, where the XML-enabled database logic controls the query logic to normalize a non-normalized query expression into a normalized query expression.

19. The system of claim 18, where the non-normalized query expression includes one or more compound entries and where the normalized query expression includes no compound entries, and where controlling the query logic includes controlling the query logic to replace a compound entry with a set of atomic entries.

20. A non-transitory machine-readable medium having stored thereon machine-executable instructions that if executed by a machine cause the machine to perform a method, the method comprising:

providing a description of an XML document having one or more elements for which a translation may be available;

storing an XML document that conforms to the description;

determining a session language, which identifies a language;

receiving a query from an internationalized application, where if the query is a non-translation-capable query, which does not include attributes for translating portions of the query into the language, then the query is rewritten to produce a translation-capable query by adding at least a predicate to the non-translation-capable query where the predicate includes attributes for translating portions of the query; and providing a session language view of an element in an XML document to the internationalized application, the element being determined, at least in part, by the translation-capable query, the session language view being determined, at least in part, by the session language.

* * * * *

UNITED STATES PATENT AND TRADEMARK OFFICE
CERTIFICATE OF CORRECTION

PATENT NO. : 8,145,993 B2
APPLICATION NO. : 11/649004
DATED : March 27, 2012
INVENTOR(S) : Agarwal et al.

It is certified that error appears in the above-identified patent and that said Letters Patent is hereby corrected as shown below:

In column 5, line 4-5, delete "servelet," and insert -- servlet, --, therefor.

Signed and Sealed this
Thirty-first Day of July, 2012

David J. Kappos
*Director of the United States Patent and Trademark Office*